(12) United States Patent
Armstrong et al.

(10) Patent No.: US 9,825,414 B2
(45) Date of Patent: Nov. 21, 2017

(54) WALL PLATE

(71) Applicants: Paul John Armstrong, Marshfield, MA (US); Jill Armstrong, Marshfield, MA (US)

(72) Inventors: Paul John Armstrong, Marshfield, MA (US); Jill Armstrong, Marshfield, MA (US)

( * ) Notice: Subject to any disclaimer, the term of this patent is extended or adjusted under 35 U.S.C. 154(b) by 0 days.

(21) Appl. No.: 15/413,280

(22) Filed: Jan. 23, 2017

(65) Prior Publication Data

US 2017/0214201 A1 Jul. 27, 2017

Related U.S. Application Data

(60) Provisional application No. 62/281,607, filed on Jan. 21, 2016.

(51) Int. Cl.
*H01R 31/06* (2006.01)
*H01R 13/639* (2006.01)
*H01R 24/62* (2011.01)
*H01R 24/76* (2011.01)
*H01R 107/00* (2006.01)

(52) U.S. Cl.
CPC ......... *H01R 31/06* (2013.01); *H01R 13/6395* (2013.01); *H01R 24/62* (2013.01); *H01R 24/76* (2013.01); *H01R 2107/00* (2013.01)

(58) Field of Classification Search
CPC ......... H01R 31/06; H01R 24/62; H01R 24/76
See application file for complete search history.

(56) References Cited

U.S. PATENT DOCUMENTS

| 4,895,527 | A  | * | 1/1990  | Brown     | H01R 13/447 439/147 |
| D359,271  | S  | * | 6/1995  | Reinholt  | D13/156 |
| 6,297,450 | B1 | * | 10/2001 | Yu        | H02G 3/14 174/480 |
| D463,367  | S  | * | 9/2002  | Luu       | D13/139.1 |
| 7,140,922 | B2 | * | 11/2006 | Luu       | H01R 31/065 439/651 |
| 7,374,454 | B1 | * | 5/2008  | Wang      | H01R 13/518 439/373 |
| 7,528,323 | B2 | * | 5/2009  | Wu        | H01R 13/72 174/66 |
| 7,559,795 | B2 | * | 7/2009  | Byrne     | H01R 31/06 439/536 |
| D699,198  | S  | * | 2/2014  | Zaslaysky | D13/156 |
| 8,864,517 | B2 | * | 10/2014 | Cohen     | H01R 13/73 439/536 |

(Continued)

*Primary Examiner* — Briggitte R Hammond
(74) *Attorney, Agent, or Firm* — Waller Lansden Dortch & Davis LLP; Mark A. Pitchford; Nicolo Davidson

(57) ABSTRACT

A wall plate apparatus including a plate having a rear side and a front side. A power adapter housing can extend from the front side of the plate, the power adapter housing including an internal cavity having an adapter opening oriented towards the rear side of the plate. A cable opening can be defined in the power adapter housing, the cable opening communicating the front side of the plate with the internal cavity of the power adapter housing. The apparatus can include a power adapter having a converter module received within the power adapter housing and a cable connected to the converter module, the cable extending through the cable opening in the power adapter module.

12 Claims, 6 Drawing Sheets

(56) References Cited

U.S. PATENT DOCUMENTS

| | | | |
|---|---|---|---|
| 9,147,973 B1 * | 9/2015 | Madison | H01R 13/6395 |
| D781,241 S * | 3/2017 | Knight | D13/156 |
| 2004/0142601 A1 * | 7/2004 | Luu | H01R 25/006 |
| | | | 439/652 |
| 2015/0340826 A1 * | 11/2015 | Chien | A61L 9/03 |
| | | | 439/490 |

* cited by examiner

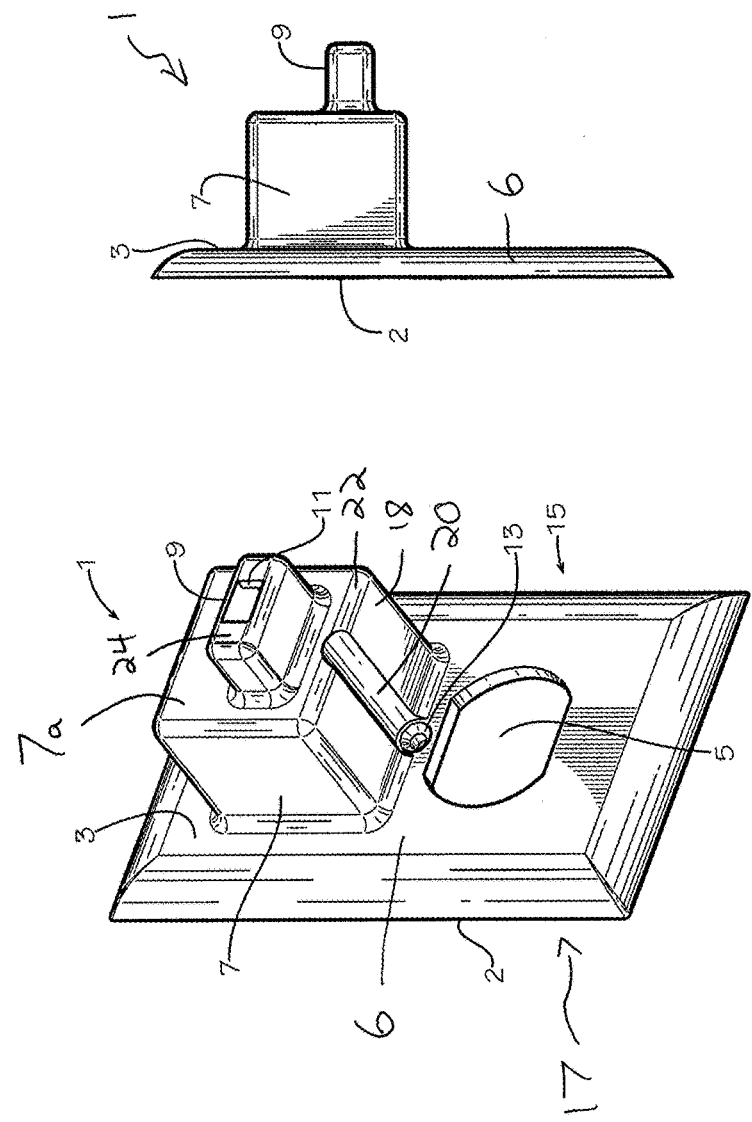

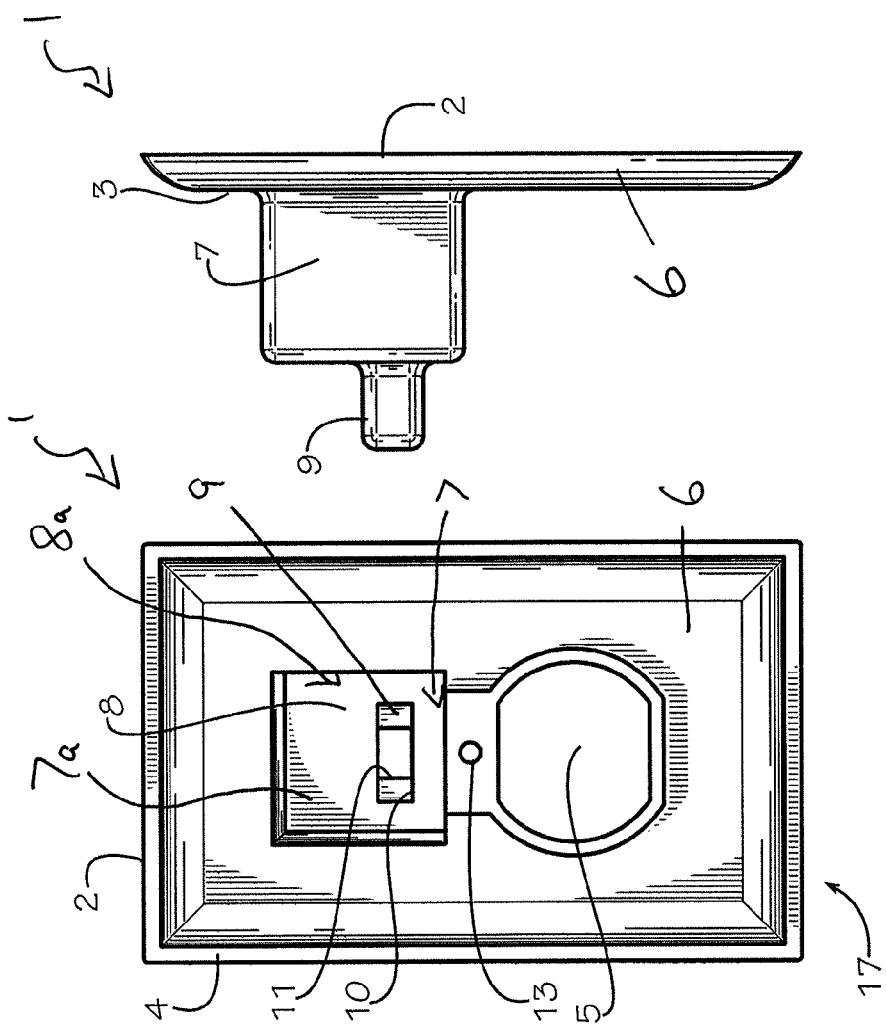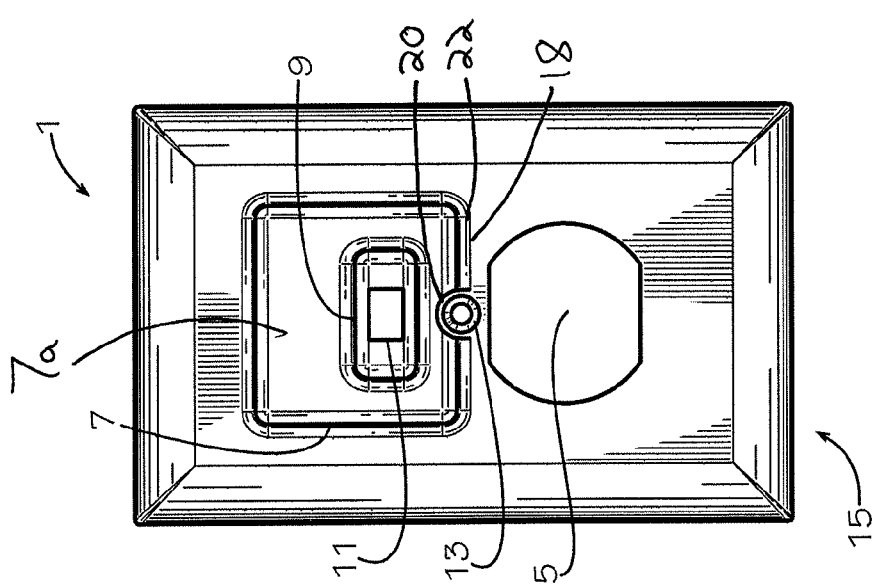
FIG. 5
FIG. 4
FIG. 3

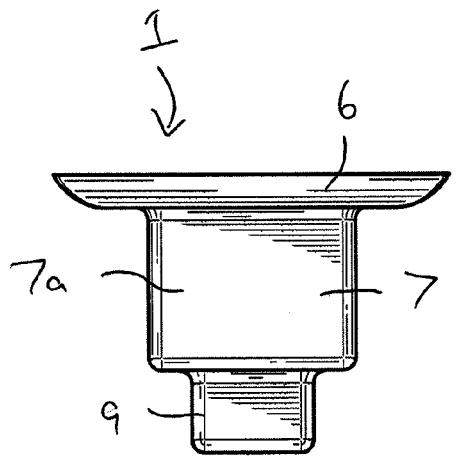
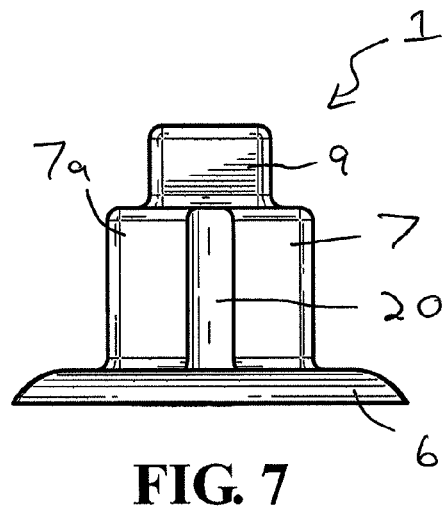
FIG. 6          FIG. 7
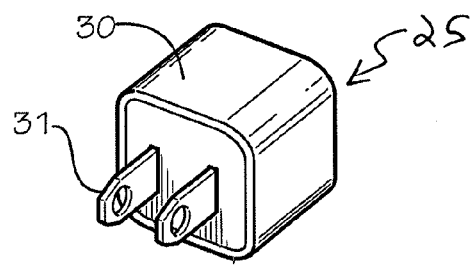
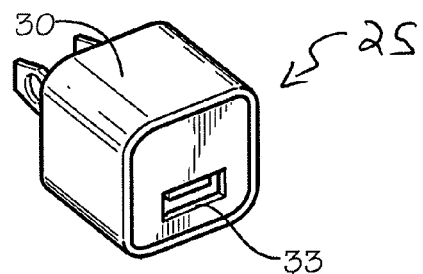
FIG. 8A          FIG. 8B
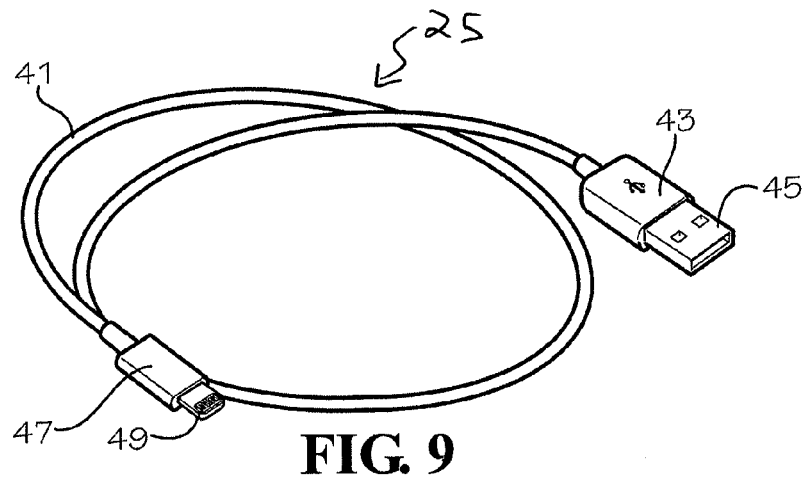
FIG. 9

WALL PLATE

CROSS-REFERENCES TO RELATED APPLICATIONS

This application claims priority to and is a non-provisional of U.S. patent application Ser. No. 62/281,607 filed Jan. 21, 2016 entitled "WALL PLATE", which is herein incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The presently-disclosed subject matter generally relates to a wall plate for covering an electrical outlet. In particular, embodiments of the presently-disclosed subject matter relate to a wall plate for an electrical outlet that can house a power adapter.

Mobile and/or portable electronic devices are a part of ordinary life for many people. People rely on mobile phones, portable computers, digital music players, digital cameras, and other wearable, portable, and/or mobile electronic devices on a daily basis. These devices help people communicate, organize their schedules, download and consume media, perform work functions, and more from virtually any location.

Electronic devices have become immensely popular in large part because advances in battery technology have made the devices smaller, more reliable, and more convenient. Newer battery technologies such as lithium ion and lithium polymer permit electronic devices to operate independently for hours or even days without a charge. Nonetheless, users must still charge their electronic devices on a regular basis.

Electronic devices are typically charged with a direct current (DC) power supply, whereas most electrical outlets only supply alternating current (AC) power. Thus, electronic devices are connected to electrical outlets with power adapters that convert the alternating current (AC) from the electrical outlet to a direct current (DC).

Others have attempted to develop electrical outlets that make it easier and more convenient to charge an electronic device. For instance, electrical outlets have been developed that include Universal Serial Bus (USB) ports on the electrical outlets themselves that provide DC power. An electronic device can be charged by connecting the device to the USB ports using a USB cable. Accordingly, these DC electrical outlets act as permanent charging stations that can readily charge an electronic device. However, these electrical outlets are not adaptable to existing outlets in a residential or commercial building, as the existing outlets must be entirely replaced with the new outlets which include the USB ports. Replacing existing electrical outlets can be dangerous, cumbersome, and costly. Furthermore, the permanent nature of these electrical outlets may not be desirable in all applications.

Accordingly, there remains a need for a device and system for installing a power adapter on an electrical outlet that can be easily modified and does not permanently convert the outlet to a DC power supply. There also remains a need for a device and system that can install a power adapter and any associated cables on an electrical outlet so that one can reliably charge an electric device from the electrical outlet.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a wall plate apparatus including a plate having a rear side and a front side. A power adapter housing can extend from the front side of the plate, the power adapter housing including an internal cavity having an adapter opening oriented towards the rear side of the plate. A cable opening can be defined in the power adapter housing, the cable opening communicating the front side of the plate with the internal cavity of the power adapter housing.

Another aspect of the present disclosure is a wall plate apparatus including a plate having a rear side and a front side. A power adapter housing can extend outward from the front side of the plate. A cable opening can be defined in the power adapter housing. The apparatus can include a power adapter including a converter module (e.g., AC to DC power converter) received within the power adapter housing and a cable connected to the converter module and extending through the cable opening in the power adapter housing.

Another aspect of the present disclosure is a wall plate apparatus for an electrical outlet having a first receptacle and a second receptacle, the apparatus including a plate having a rear side and a front side, the plate mountable to the electrical outlet. A power adapter housing can extend from the front side of the plate, the power adapter housing including an internal cavity that is open from a rear side of the plate. A cable opening can be defined in the power adapter housing, the cable opening communicating the front side of the plate with the internal cavity of the power adapter housing. A receptacle aperture can be defined through the plate. When the plate is connected to the electrical outlet, the power adapter housing can be positioned over the first receptacle and the receptacle aperture can be positioned over the second receptacle.

Numerous other objects, advantages and features of the present disclosure will be readily apparent to those of skill in the art upon a review of the following drawings and description of a preferred embodiment.

BRIEF DESCRIPTION OF THE DRAWINGS

FIG. 1 shows an isometric front view of one embodiment of a wall plate apparatus of the present disclosure.

FIG. 2 shows a left side elevation view of the wall plate apparatus of FIG. 1.

FIG. 3 shows a front elevation view of the wall plate apparatus of FIG. 1.

FIG. 4 shows a rear elevation view of the wall plate apparatus of FIG. 1.

FIG. 5 shows a right side elevation view of the wall plate apparatus of FIG. 1.

FIG. 6 shows a top view of the wall plate apparatus of FIG. 1.

FIG. 7 shows a bottom view of the wall plate apparatus of FIG. 1.

FIG. 8A shows an isometric rear view of a converter module of a power adapter that can be used with the wall plate apparatus of FIG. 1.

FIG. 8B shows a perspective front view of the converter module of FIG. 8A.

FIG. 9 shows a USB cable that can be used with the converter module of FIG. 8A.

DETAILED DESCRIPTION

Figure 11:
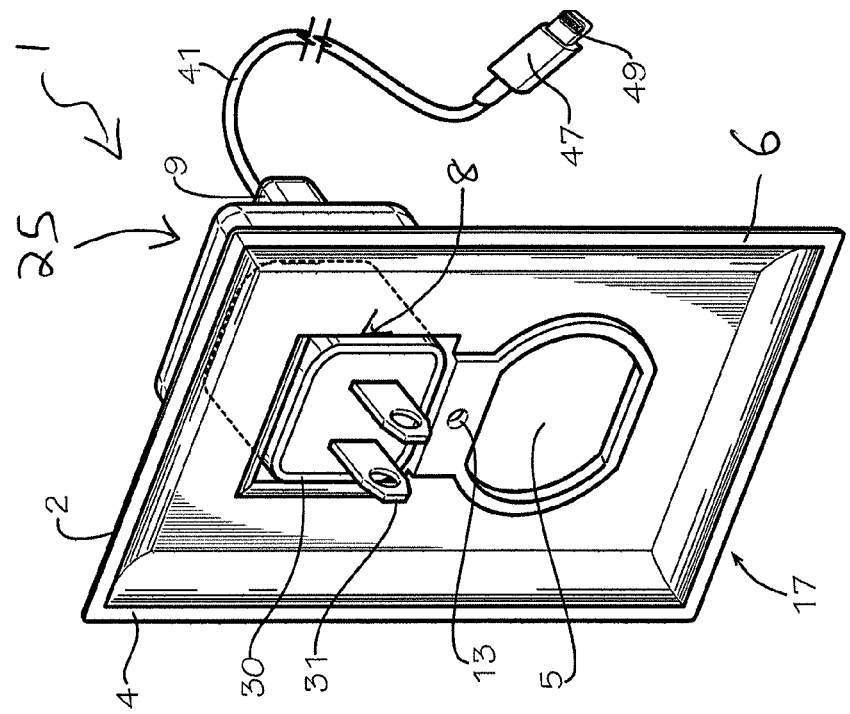
FIG. 11 shows a rear perspective view of a power adapter received in a power adapter housing of the wall plate apparatus of FIG. 1.

While the making and using of various embodiments of the presently-disclosed subject matter are discussed in detail below, it should be appreciated that the presently-disclosed subject matter provides many applicable concepts that are embodied in a wide variety of contexts. The specific embodiments discussed herein are merely illustrative of certain ways to make and use the presently-disclosed subject matter and do not limit the scope of the presently-disclosed subject matter. Those of ordinary skill in the art will recognize numerous equivalents to the embodiments described herein. Such equivalents are considered to be within the scope of the presently-disclosed subject matter and are covered by the claims.

The presently-disclosed subject matter includes a wall plate apparatus which can be used to install a DC power adapter on an AC power supply. The wall plate apparatus can retain the power adapter on the AC power supply for an extended period or indefinitely. The present wall plate apparatus can be installed, removed, and interchanged easily and quickly on existing electrical outlets without affecting the underlying electrical outlets and electrical circuits contained therein. Accordingly, installation and use of the present wall plate apparatus does not permanently convert an AC power supply to a DC power supply.

An electrical outlet having the wall plate apparatus and a DC power adapter installed thereon can provide quick and reliable access to a power adapter. Embodiments of the present wall plate apparatus also have the capability of maintaining all the components of a power adapter, such as any converter modules and cables, in one location so that these components are not misplaced. Furthermore, an electrical outlet can be converted back to its original state by removing the wall plate apparatus and replacing the wall plate apparatus with a wall plate having a conventional design.

A specific embodiment of a wall plate apparatus is described herein for illustrative purposes. As described herein, an upright position of a wall plate apparatus 1 refers to the orientation shown in FIG. 1. Any descriptions herein that refer to vertical, horizontal, top, bottom, left, right, or other orientations are described with respect to the wall plate apparatus 1 shown in FIG. 1 unless otherwise specified. In this regard, "front" refers to a side closest to the viewer from the perspective shown in FIG. 1, whereas "rear" or "back" refers to a side facing away from a viewer from the perspective view shown in FIG. 1.

Furthermore, the wall plate apparatus 1 discussed herein can include or can be utilized with a power adapter 25, one embodiment of a power adapter 25 being shown in FIGS. 8A, 8B, and 9. The power adapter 25 can include an AC-to-DC converter module 30 and a cable 41. The converter module 30 can be configured to convert a received AC current from an AC power supply to a DC current. To charge an electronic device, electrical terminals 31 on the converter module 30 can be connected to an electrical outlet. The cable 41 is then used to connect the electronic device to the converter module 30 by connecting the connector 45 on the converter module plug 43 to the port 33 on the converter module 30, and then connecting the connector 49 on the electronic device plug 47 to the electronic device. In some embodiments, port 33 can be a Universal Serial Bus port.

Looking now to FIG. 1, a perspective front view of one embodiment of a wall plate apparatus 1 is shown. The wall plate apparatus 1 includes a plate 6 having a front side 15 and a rear side 17. In some embodiments, the entire plate 6 can be substantially planar. In other embodiments, the center portion of a front surface 3 of the plate 6 can be substantially planar. The peripheral edge 2 of the plate 6 can include a rounded contour in some embodiments. In this manner, when the wall plate apparatus 1 is mounted to an electrical outlet in a wall of a building, the plate 6 forms a continuous curved surface from the planar front surface 3 to the peripheral edge 2 of the plate 6 abutting the wall. The plate 6 can be configured to be mounted to a conventional AC power electrical outlet that has at least two receptacles, where a first receptacle of the electrical outlet is dedicated for use with a power adapter and a second receptacle can remain freely accessible for connection with traditional AC connector plugs of electronic devices.

Figure 10:
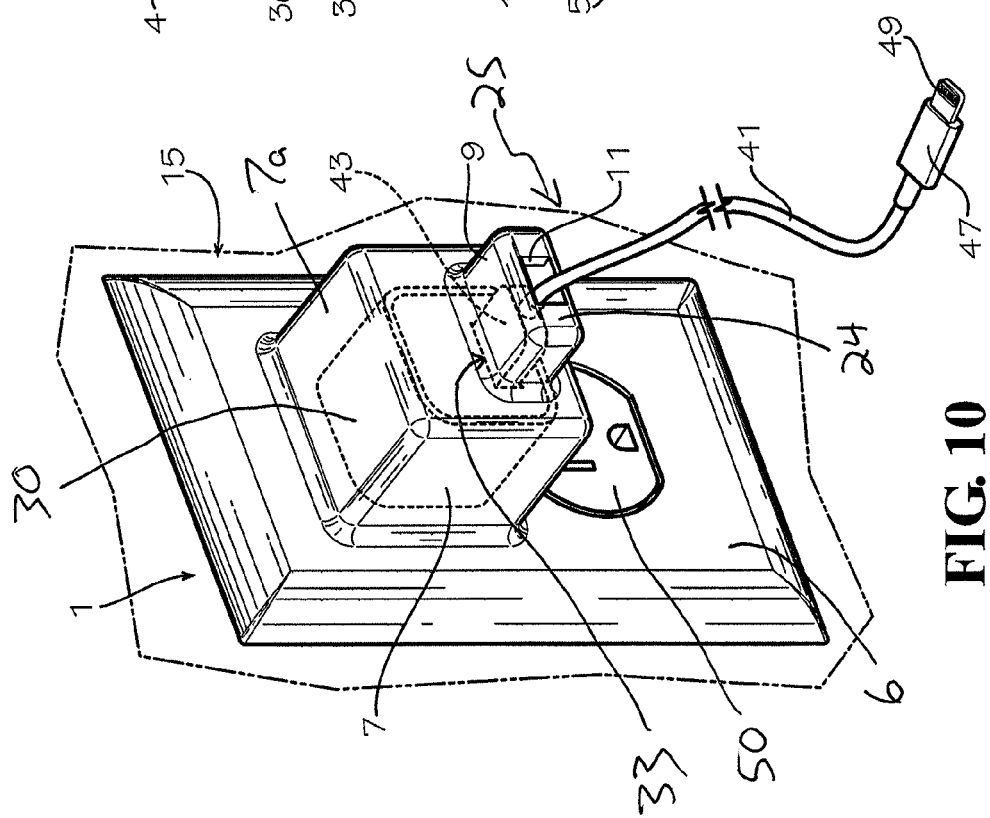
FIG. 10 shows a perspective front view of a power adapter installed in the wall plate apparatus of FIG. 1.

In some embodiments, as shown in FIG. 10, an electrical outlet can be configured such that the receptacles of the outlet are in a vertical orientation. In other embodiments, the receptacles of the electrical outlet can be oriented in a horizontal orientation. The plate 6 can be configured to be mounted to an electrical outlet having either orientation.

Referring now to FIGS. 1-5, a power adapter housing 7 can extend from the front side 15 of the plate 6, and particularly from the front surface 3 of the plate 6. The power adapter housing 7 is configured to receive a converter module of a power adapter. The shape of the power adapter housing 7 can generally conform to the shape of a desired converter module. In some embodiments, the power adapter housing 7 can have a generally cubic exterior shape that extends outwardly from the front surface 3 of the plate 6 in a frontward direction to receive a cubic shaped converter module. In other embodiments, power adapter housing 7 can have a substantially cylindrical exterior shape to receive a cylindrical converter module.

In some embodiments, power adapter housing 7 can have a converter module housing 7a extending from a front side 15 of the plate 6, and a cable plug housing 9 can be further provided that extends outwardly from a front surface of the converter module housing 7a. The converter module housing 7a and the cable plug housing 9 together are configured to receive a power adapter. As shown in FIG. 10, converter module housing 7a can be shaped to receive converter module 30 and cable plug housing 9 can be shaped to receive converter module plug 43 on cable 41.

Looking now to FIGS. 2 and 5, side elevation views of the wall plate 1 are shown. The figures illustrate that the rear side 17 of the plate 6 is generally flat so that it can abut a wall surface that surrounds an electrical outlet. The planar portion of the front surface 3 extends in a forward direction with respect to the peripheral edge 2. The converter module housing 7a extends in a forward direction with respect to the planar portion of the front surface 3 of the plate 6. The cable plug housing 9 extends in a forward direction with respect to the front end of the converter module housing 7a.

Looking now to FIGS. 1 and 4, power adapter housing 7 can include an internal cavity 8 which can receive a converter module of a power adapter. In some embodiments, both the internal cavity 8 and an exterior shape of the power housing 7 can have a shape that conforms to the shape of a converter module of a particular power adapter. In other embodiments, the internal cavity 8 can be shaped to receive a converter module of a power adapter while the power adapter housing 7 can have an external shape that does not conform to the shape of the converter module.

In some embodiments, the internal cavity 8 of the power adapter housing 7 can be sized to produce an interference fit with a converter module of a power adapter such that the converter module can be selectively retained within the power adapter housing 7 even when the wall plate apparatus 1 is removed from an electrical outlet in a wall. In other embodiments, the internal cavity 8 can be sized to loosely receive a converter module within the internal cavity 8, such that the wall plate apparatus 10 can be used in conjunction with converter modules and power adapters having different shapes and sizes.

Referring now to FIGS. 4 and 10, when the wall plate apparatus 1 is installed on an electrical outlet, the rear side 17 faces the electrical outlet whereas the front side 15 will face outwardly away from the electrical outlet 50 and a mounting surface of a wall in which the electrical outlet 50 is mounted. The converter module housing 7a can include the inner cavity 8 that dimensionally corresponds to the shape of a converter module of a power adapter. The inner cavity 8 can include an adapter opening 8a oriented towards a rear side 17 of the plate 6, such that the inner cavity 8 is open from a rear side 17 of the plate 6 and a converter module 30 can be received in the internal cavity 8 from a rear side 17 of the plate 6. The converter module housing 7a can therefore receive and house a converter module 30 in its internal cavity 8.

Similarly, the cable plug housing 9 includes a cavity 10 that is open towards the rear side 17 of the wall plate 17. The cable plug housing cavity 10 dimensionally corresponds to the shape of a converter module plug 43 on a cable 41. The cable plug housing 9 can therefore receive and house a converter module plug 43 in some embodiments.

Looking still to the rear side 17 of the plate 6, a rear contact surface 4 is provided. The rear contact surface 4 defines a planar surface, the peripheral edge 2 of the plate 6 terminating at the rear contact surface 4. When the plate 6 is mounted to an electrical outlet, the rear contact surface 4 can face and/or contact a wall surface that surrounds the electrical outlet to provide a secure and flush fit of the plate 6 against the wall.

Looking now to FIGS. 1 and 10, a cable opening 11 can be defined through the power adapter housing 7. In those embodiments including both a converter module housing 7a and a cable plug housing 9, the cable opening 11 can be defined through the cable plug housing 9. The cable opening 11 can communicate a front side 15 of the plate 6 with the internal cavity in the power adapter housing 7. The cable opening 11 can allow passage of a cable 41 through the power adapter housing 7 such that the cable 41 can be connected to a converter module 30 positioned in the inner cavity of the power adapter housing 7. In some embodiments, power adapter housing 7 can include a front distal end 24, and cable opening 11 can be defined through the front distal end 24 of the power adapter housing 7. In some embodiments, front distal end 24 of the power adapter housing 7 can be defined on the converter module housing 7a when no cable plug housing is present. In other embodiments, the front distal end 24 of the power adapter housing 7 can be defined on the cable plug housing 9. In other embodiments, depending on the orientation of the port 33 on the converter module 30 when the converter module 30 is received in the power adapter housing 7, the cable opening 11 can be positioned on one of the sidewalls of the power adapter housing.

In some embodiments, the cable opening 11 is dimensioned so that the electronic device plug 47 of the cable 41 can be threaded or inserted through the rear side of the cable opening 11, and the cable 41 can be pulled through the cable opening 11, whereas passage of the converter module plug 43 of the cable 41 through the cable opening 11 can be prevented, the converter module plug 43 being larger than the cable opening 11. As such, once a cable 41 connected to a converter module 30 via converter module plug 43 is inserted through the rear side of the cable opening 11, the converter module plug 43 is received in the cable plug housing 9, the converter module 30 is received in the converted module housing 7a, and the wall plate apparatus 10 is mounted to an electrical outlet, both the converter module 30 and the converter module plug 43 on the cable 41 can be retained within the power adapter housing 7. Such a configuration can help prevent the cable 41 from becoming disconnected from the converter module 30 unintentionally. In other embodiments, the cable opening 11 can be dimensioned so that the entire cable 41 including the converter module plug 43 can pass through the cable opening 11. Such a configuration can allow the cable 41 to be readily disconnected from the converter module 30 when the wall plate apparatus 1 is mounted on an electrical outlet such that a user can switch between USB cables having different electronic device plugs 47 (e.g., micro USB plugs versus propriety plugs such as Apple Inc.'s Lighting connector).

Figure 12:
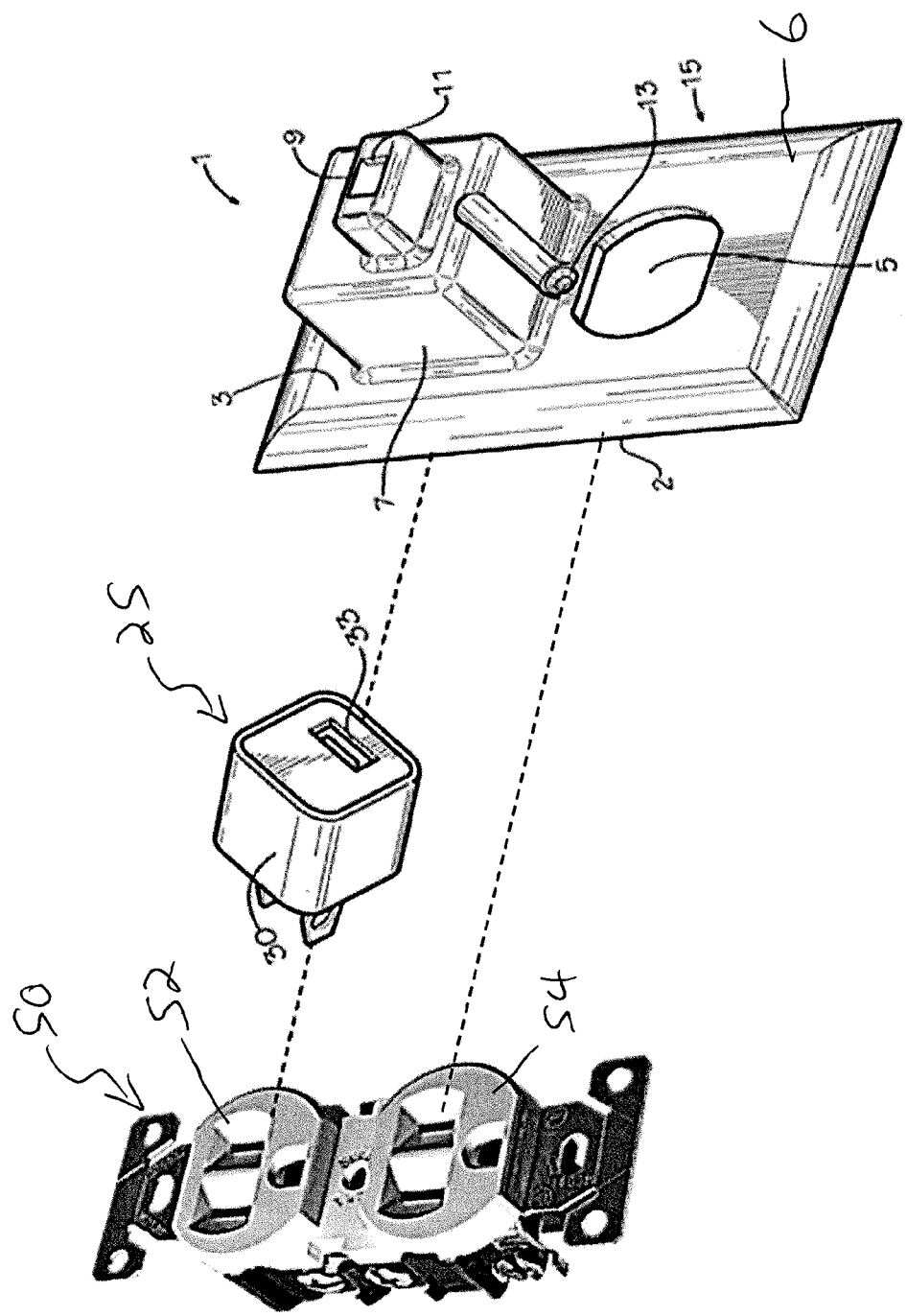
FIG. 12 is an exploded view of the wall plate apparatus of FIG. 10 being installed on an electrical outlet.

The plate 6 can further include a receptacle aperture 5 that extends through the plate 6 and is positioned adjacent power adapter housing 7. As shown in FIG. 12, the receptacle aperture 5 and the power adapter housing 7 are oriented such that when the wall plate apparatus 1 is installed over an electrical outlet 50, the power adapter housing 7 can be positioned over a first receptacle 52 of the electrical outlet 50, and the receptacle aperture 5 can be positioned over the second receptacle 54. The receptacle aperture 5 can provide access to an AC power supply for conventional AC connector plugs via the second receptacle 54 on the electrical outlet 50 even after the wall plate apparatus 1 has been installed on the electrical outlet 50. In some embodiments, the wall plate apparatus 1 can be configured such that the wall plate apparatus 1 can be mounted to an electrical outlet 50 with power adapter housing 7 positioned over the first receptacle 52 of the electrical outlet 50, the power adapter 25 connected to the first receptacle 52, or the wall plate apparatus can be rotated 180 degrees and mounted to the electrical outlet 50 such that the power adapter housing 7 can be positioned over the second receptacle 54, the power adapter 25 connected to the second receptacle 54. As such, wall plate apparatus 1 can accommodate both configurations to provide a user with flexibility when mounting wall plate 1 on an electrical outlet 50 such that power adapter housing 7 can be placed in a desirable or more convenient position over either the first or second receptacles 52 or 54 of the electrical outlet 50 based on the needs of a user. Therefore, either a first receptacle 52 or a second receptacle 54 of an electrical outlet 50 can be converted to a dedicated DC power supply in some embodiments.

As shown in FIG. 12, in some embodiments, power adapter 25 and converter module 30 can be removable from power adapter housing 7 such that different converter modules 30 can be readily interchangeable in wall plate apparatus 1, or a malfunctioning converter module 30 can be readily replaced in wall plate apparatus 1 if needed. In other embodiments, converter module 30 and power adapter 25 can be integrally formed within power adapter housing 7.

The wall plate 1 can further include a fastener aperture 13 that extends through the plate 6. The fastener aperture 13 in some embodiments can generally be positioned at a centermost position on the front surface 3 of plate 6. The fastener aperture 13 is positioned so that when the wall plate apparatus 1 is installed over an electrical outlet the fastener aperture 13 is oriented over a threaded hole in the electrical outlet that can receive a screw. The wall plate apparatus 1 can thus be mounted over an electrical outlet by placing the wall plate apparatus 1 over the electrical outlet with the fastener aperture 13 aligned with a threaded hole in the electrical outlet, passing a screw or other suitable fastener through the fastener aperture 13, and then securing the screw to the threaded screw hole in the electrical outlet. In some instances the threaded screw hole may be provided on the electrical outlet itself, on a bracket that holds the electrical outlet, and/or on a surface of a wall to which the electrical outlet is mounted.

As shown in FIGS. 1 and 3, the receptacle aperture 5 can be positioned adjacent the power adapter housing 7 on the plate 6. The fastener aperture 13 in some embodiments can be positioned centrally with respect to the front surface 3 of the plate 6 between the power adapter housing 7 and the receptacle aperture 5. Additionally, in some embodiments, a fastener channel 20 can be defined in the sidewall 18 of the power adapter housing 7 positioned adjacent the fastener aperture 13, shown as the bottom side wall 18 of the converter module housing 7a in FIGS. 1 and 3. The fastener channel 20 can extend from a front edge 22 of the power adapter housing 7 or the converter module housing 7a, extend toward the fastener aperture 13, and extend into the fastener aperture 13. In some embodiments, fastener channel 20 can have a circular or semicircular cross section generally corresponding to the circular shape of the head of a fastener such as a screw or a bolt, the shape of the fastener channel 20 also corresponding to a front side of the fastener aperture 13. Fastener channel 20 can generally extend perpendicularly from the front surface 3 of the plate 6 and from the fastener aperture 13. This cut out cross section provides access to the fastener aperture 13 for a screw and/or any tools required for mounting the wall plate apparatus 1 to an electrical outlet.

In this regard, FIGS. 10 and 11 show a wall plate apparatus 1 including a power adapter 25 housed within the power adapter housing 7 of the plate 6, the wall apparatus 1 installed on an electrical outlet 50. The power adapter 25 is comprised of the converter module 30 and the cable 41. The converter module 30 is housed within the converter module housing cavity 8 so that the electrical terminals 31 on the converter module 30 extend outwardly from the rear side 17 of the wall plate 11. When the wall plate apparatus 1 is mounted to the electrical outlet 50 and the power adapter 25 is received in the power adapter housing 7, the terminals 31 of the converter module 30 can be inserted in and connected to a receptacle of the electrical outlet 50. The cable 41 is coupled to the converter module 30 such that the converter module plug 43 is housed within the cable plug housing 9. The cable opening 11 defined in the power adapter housing 7 is dimensioned so that the wire 41 and electronic device plug 47 on the cable 41 can pass through the power adapter housing 7 while the converter module plug 43 remains housed within the cable plug housing 9. When the converter module 30 is received in the power adapter housing 7, the port 33 of the converter module 30 can be aligned with the cable opening 11 of the power adapter housing 7 to facilitate connection of the cable 41 to the converter module 30.

The wall plate apparatus 1 with the power adapter housed therein can be secured to an electrical outlet by securing a screw through the fastener aperture 13 and to the electrical outlet 50. When installed in this manner, a user can access a DC power from the electronic device plug 47 on the power adapter cable 41, which can be used to charge electronic devices. A user can also access AC power from the electrical outlet from the receptacle that remains exposed through the receptacle aperture 5.

Figure 13:
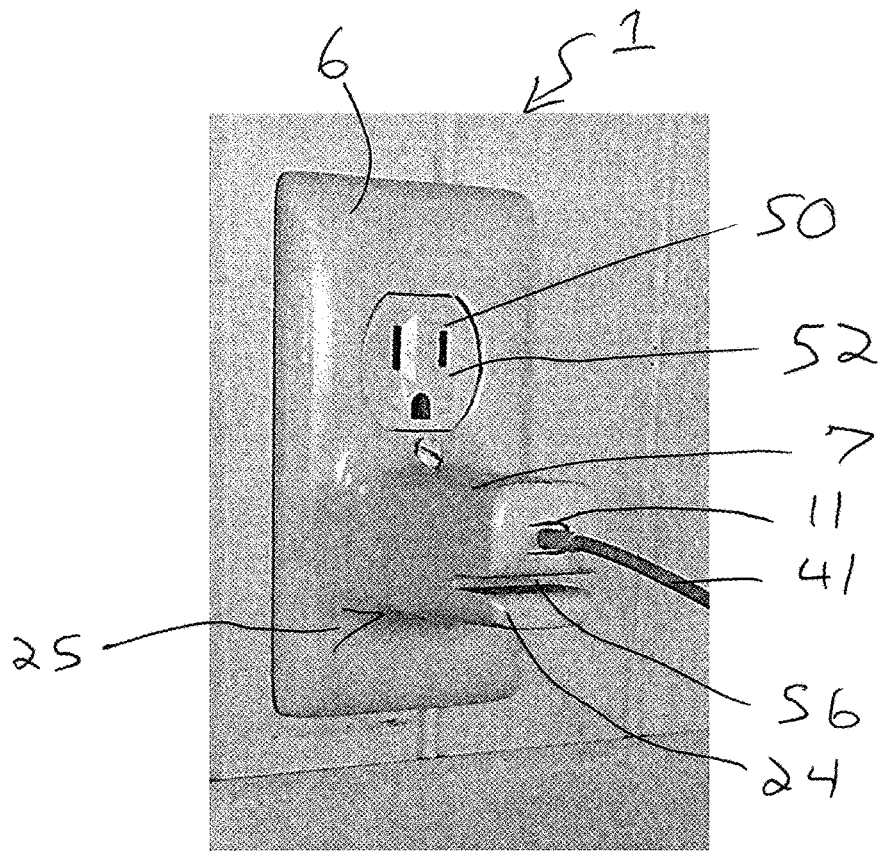
FIG. 13 is front perspective view of another embodiment of a wall plate apparatus of the present disclosure having a cable retention channel defined in a power adapter housing of the wall plate apparatus.
Figure 14:
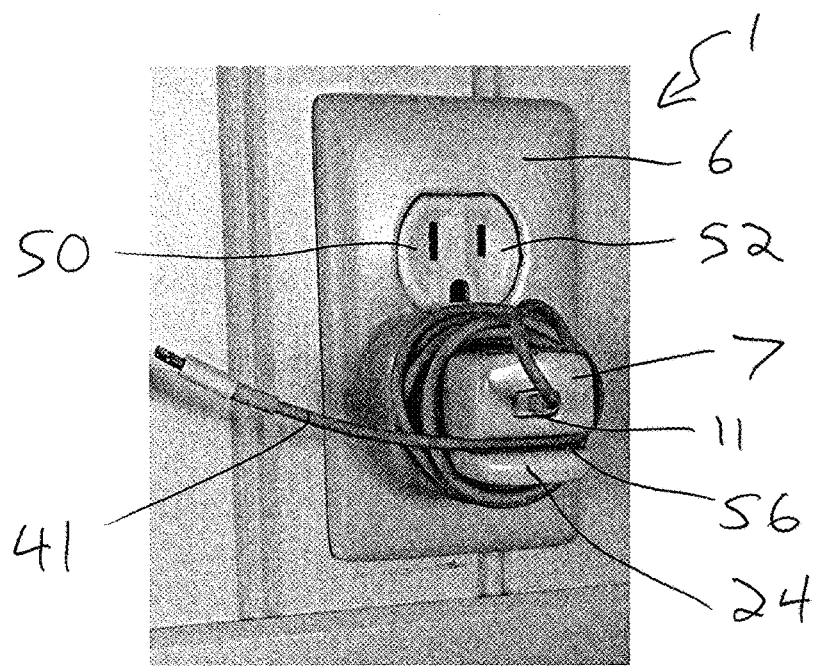
FIG. 14 is a front perspective view of the wall plate apparatus of FIG. 13 with a cable of a power adapter wound around the power adapter housing and received in the cable retention channel.

In some embodiments, as shown in FIGS. 13-14, the wall plate apparatus 1 can include a cable retention channel 56 defined in the power adapter housing 7. Cable retention channel 56 can help secure cable 41 in a fixed location on wall plate apparatus 1 when cable 41 and power adapter 25 are not in use. In some embodiments, as shown in FIGS. 13-14, cable retention channel 56 can be defined in a front distal end or front surface 24 of power adapter housing 7. Cable 41 when not in use can be wound around the circumference of power adapter housing 7 with an end of the cable 41 received in the cable retention channel 56 to secure the cable 41 on the wall plate apparatus 1. In other embodiments, cable retention channel 56 can extend circumferentially around the side walls of the power adapter housing 7 such that as cable 41 is wound around power adapter housing 7, cable 41 can continually be received in cable retention channel 56. In other embodiments, a front distal end 24 of the power adapter housing 7 can include a flange extending laterally outward around a circumference of the front distal end 24, the flange forming a retention wall behind which cable 41 can be wound. In one embodiment, the cable retention channel 56 is tapered from the front of the power adapter housing 7 toward the back of the power housing adapter 7 such that a width of the cable retention channel 56 decreases from a front of the power adapter housing 7 to the back of the power adapter housing 7 such that the USB cable 41 may frictionally engage the cable retention channel 56 (i.e., be wedged in the cable retention channel 56 regardless of the diameter of the USB cable 41). In one embodiment, the cable retention channel 56 is the portion of the power adapter housing 7 that cooperates with the fastener to retain the electrical terminals 31 of the power adapter 25 in the receptacle 52 when the wall plate apparatus is installed on the electrical outlet. In another embodiment, the cable plug housing 9 is the portion of the wall plate apparatus that cooperates with the fastener to retain the electrical terminals 31 of the power adapter 25 in the receptacle 52 when the wall plate apparatus is installed on the electrical outlet.

Those of ordinary skill in the art will appreciate that the presently-disclosed wall plate apparatus can provide numerous advantages and solves many long-felt but unmet needs. Because the power adapter 25 is secured to an electrical outlet with the wall plate apparatus 1, the power adapter 25 and all of its components are readily available for use. However, the electrical outlet 50 can be easily and quickly modified to have two AC power supplies by removing the wall plate apparatus 1, removing the power adapter from the electrical outlet, and reinstalling a conventional wall plate (e.g., two receptacle apertures) on the electrical outlet 50.

While an embodiment of a wall plate apparatus has been described for illustrative purposes, other embodiments encompassed by the presently-disclosed wall plates should not be limited by the present embodiment. For instance, wall plates may be configured for use with a variety of electrical outlets, including electrical outlets with any number of receptacles and/or any type of receptacle. This includes, but is not limited to, Type A, Type B, Type C, Type D, Type E, Type F, Type G, Type H, Type I, Type J, Type K, Type L, Type M, Type N, and Type O electrical outlets.

In this regard, some embodiments of the wall plate apparatus may or may not include fastener apertures or may include a plurality of fastener apertures. The type and number of fastener apertures can vary depending on the type of electrical outlet the wall plate apparatus is configured to be installed on. In some instances a wall plate apparatus may be mounted to an electrical outlet and/or a wall surface surrounding an electrical outlet by other coupling mechanisms, such as nails, clips, adhesives, or another suitable fastener, and the plate can be configured appropriately for use with such coupling mechanisms.

Embodiments of a wall plate apparatus may be provided with any number of power adapter housings to accommodate multiple DC power adapters in some embodiments. For instance, the embodiment of the wall plate apparatus described herein may be configured to include two power adapter housings so that both receptacles on an electrical outlet can be converted to a dedicated DC power supply.

The power adapters included in or used in conjunction with the presently-disclosed wall plate apparatus are not particularly limited. The power adapter housings may be configured to receive and house power adapters from a variety of different manufactures and for a variety of different electronic devices. In some embodiments the power adapter housing can be configured to receive only power adapters having one specific size and shape. In other embodiments the wall plate apparatus can include a power adapter housing with an internal cavity that is sufficiently large to accommodate power adapters having a variety of different shapes and sizes.

In some instances, a power adapter may or may not be comprised of a separate converter module and a cable. In some embodiments the cable and the converter module of a power adapter are one integral component. The wall plate apparatus described herein can be used with or can be modified to house a power adapter that includes one integral converter module/cable assembly. In other embodiments the wall plate apparatus described herein can be modified to house a power adapter that includes two or more components. In yet other embodiments, the wall plate apparatus described herein can be modified to house fewer than all of the components of a power adapter.

In some embodiments a wall plate apparatus can include a converter module housing but not a cable plug housing. In such embodiments, the cable opening can be provided on the converter module housing, and the cable can be connected and disconnected from the converter module via the cable opening in the converter module housing.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

The presently-disclosed subject matter can comprise, consist of, or consist essentially of the elements and features of the embodiments described herein, as well as any additional or optional components or limitations described herein or otherwise useful.

All combinations of method or process steps as used herein can be performed in any order, unless otherwise specified or clearly implied to the contrary by the context in which the referenced combination is made.

All references to singular characteristics or limitations of the present disclosure shall include the corresponding plural characteristic(s) or limitation(s) and vice versa, unless otherwise specified or clearly implied to the contrary by the context in which the reference is made.

Thus, although there have been described particular embodiments of the present invention of a new and useful WALL PLATE, it is not intended that such references be construed as limitations upon the scope of this invention.

What is claimed is:

1. A wall plate apparatus, comprising:
   a plate having a rear side and a front side;
   a power adapter housing extending from the front side of the plate, the power adapter housing including an internal cavity having an adapter opening oriented towards the rear side of the plate; and
   a cable opening defined in the power adapter housing, the cable opening communicating the front side of the plate with the internal cavity of the power adapter housing, wherein the power adapter housing includes:
   a converter module housing that extends from the front side of the plate; and
   a cable plug housing that extends from a front surface of the converter module housing; wherein
   the cable opening is defined in the cable plug housing, and the cable opening is sized to prevent a converter module plug from passing therethrough, and wherein the a height and a width of the converter module plus are less than 0.25 inches.

2. The wall plate apparatus of claim 1, further comprising a receptacle aperture extending through the plate, the receptacle aperture positioned to align with a receptacle of an electrical outlet when the wall plate apparatus is installed on the electrical outlet.

3. The wall plate apparatus of claim 1, further comprising:
   a receptacle aperture extending through the plate; and
   a fastener aperture extending through the plate, the fastener aperture positioned between the receptacle aperture and the power adapter housing.

4. The wall plate apparatus of claim 1, wherein:
the wall plate apparatus further comprises a converter module and cable, and a fastener; and
the power adapter housing cooperates with a fastener inserted in a fastener aperture of the wall plate apparatus to retain electrical terminals of the converter module in engagement with a receptacle of an electrical outlet when the wall plate apparatus is installed on the electrical outlet.

5. The wall plate apparatus of claim 1, further comprising a fastener aperture extending through the plate and a fastener, wherein the fastener aperture is configured to allow the fastener to engage a threaded hole of an electrical outlet when the wall plate apparatus is installed on the electrical outlet such that the fastener cooperates with the threaded hole to the retain the wall plate apparatus on the electrical outlet.

6. The wall plate apparatus of claim 5, wherein the power adapter housing includes a fastener channel defined in a sidewall of the power adapter housing adjacent the fastener aperture, the fastener channel extending from a front edge of the power adapter housing toward the fastener aperture.

7. The wall plate apparatus of claim 1, further comprising a cable retention channel defined in the power adapter housing, wherein the cable retention channel extends from one side of the power adapter housing to an opposing side of the power adapter housing and a width of the cable retention channel decreases from a front of the power adapter housing toward a back of the power adapter housing.

8. The wall plate apparatus of claim 7, wherein the power adapter housing further comprises:
a front surface at the front of the power adapter housing; and
the cable retention channel is defined laterally across the front surface of the power adapter housing, wherein the longitudinal direction of the wall plate apparatus extends from the power adapter housing, to a fastener aperture of the wall plate apparatus and on to a receptacle aperture of the wall plate apparatus.

9. The wall plate apparatus of claim 1, further comprising a power adapter receivable within the internal cavity of the power adapter housing.

10. The wall plate apparatus of claim 9, wherein:
the power adapter further comprises a converter module and a cable;
the converter module is receivable in the internal cavity of the power adapter housing; and
the cable is extendable through the cable opening in the power adapter housing to connect the cable to the converter module when the converter module is received in the internal cavity of the power adapter housing.

11. A wall plate apparatus, comprising:
a plate having a rear side and a front side;
a power adapter housing extending from the front side of the plate, the power adapter housing including an internal cavity having an adapter opening oriented towards the rear side of the plate;
a cable opening defined in the power adapter housing, the cable opening communicating the front side of the plate with the internal cavity of the power adapter housing; and
a fastener aperture extending through the plate and a fastener, wherein the fastener aperture is configured to allow the fastener to engage a threaded hole of an electrical outlet when the wall plate apparatus is installed on the electrical outlet such that the fastener cooperates with the threaded hole to the retain the wall plate apparatus on the electrical outlet, wherein
the power adapter housing includes a fastener channel defined in a sidewall of the power adapter housing adjacent the fastener aperture, the fastener channel extending from a front edge of the power adapter housing toward the fastener aperture.

12. A wall plate apparatus, comprising:
a plate having a rear side and a front side;
a power adapter housing extending from the front side of the plate, the power adapter housing including an internal cavity having an adapter opening oriented towards the rear side of the plate;
a cable opening defined in the power adapter housing, the cable opening communicating the front side of the plate with the internal cavity of the power adapter housing; and
a cable retention channel defined in the power adapter housing, wherein the cable retention channel extends from one side of the power adapter housing to an opposing side of the power adapter housing and a width of the cable retention channel decreases from a front of the power adapter housing toward a back of the power adapter housing, wherein the power adapter housing further comprises:
a front surface at the front of the power adapter housing; and
the cable retention channel is defined laterally across the front surface of the power adapter housing, wherein the longitudinal direction of the wall plate apparatus extends from the power adapter housing, to a fastener aperture of the wall plate apparatus and on to a receptacle aperture of the wall plate apparatus.

* * * * *